(12) United States Patent
Brisebois et al.

(10) Patent No.: US 8,755,821 B2
(45) Date of Patent: *Jun. 17, 2014

(54) LOCATION REPORTING RESPONSIVE TO TRANSITIONS IN MOTIONAL STATE OF WIRELESS EQUIPMENT

(71) Applicant: AT&T Mobility II LLC, Atlanta, GA (US)

(72) Inventors: Arthur Brisebois, Cumming, GA (US); Mark Causey, Tucker, GA (US); Adrianne Luu, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/937,404

(22) Filed: Jul. 9, 2013

(65) Prior Publication Data

US 2013/0295967 A1 Nov. 7, 2013

Related U.S. Application Data

(63) Continuation of application No. 12/969,282, filed on Dec. 15, 2010, now Pat. No. 8,509,807.

(51) Int. Cl.
*H04W 24/00* (2009.01)

(52) U.S. Cl.
USPC ................... 455/456.1; 455/456.6

(58) Field of Classification Search
CPC ....... H04W 4/02; H04W 60/00; H04W 60/04; H04W 64/00
USPC ............................ 455/456.1, 456.6
See application file for complete search history.

(56) References Cited

U.S. PATENT DOCUMENTS

| 8,060,108 | B1 | 11/2011 | Rayburn et al. |
| 2009/0207766 | A1* | 8/2009 | Hwang et al. ............ 370/310 |
| 2010/0117899 | A1 | 5/2010 | Papadimitratos et al. |
| 2010/0159990 | A1 | 6/2010 | Johnstone |
| 2010/0260141 | A1 | 10/2010 | Chowdhury et al. |
| 2010/0261474 | A1 | 10/2010 | Gollapudi et al. |
| 2011/0081931 | A1 | 4/2011 | Kuwada et al. |

OTHER PUBLICATIONS

Office Action dated Sep. 24, 2012 for U.S. Appl. No. 12/969,282, 21 pages.

* cited by examiner

*Primary Examiner* — Patrick Edouard
*Assistant Examiner* — Shantell L Heiber
(74) *Attorney, Agent, or Firm* — Amin, Turocy & Watson, LLP

(57) ABSTRACT

Location of wireless equipment is reported based at least on transition amongst motional states of the wireless equipment. Measured data and metrics are employed for detection of at least one movement condition of wireless equipment to identify changes in a mobility profile thereof. Change in the mobility profile can convey change in motional state of the wireless equipment; analysis of the data and metrics enables determination of such change. While idle, the wireless equipment can monitor its mobility profile to identify changes in the motional state of the wireless equipment. Identification of certain changes in the motional state of the wireless equipment enable the wireless equipment to measure, report, and update location thereof at the network platform of a network operator that provides wireless service to the wireless equipment. Reported location of the wireless equipment can be exploited for several location-based services.

20 Claims, 7 Drawing Sheets

LOCATION REPORTING RESPONSIVE TO TRANSITIONS IN MOTIONAL STATE OF WIRELESS EQUIPMENT

CROSS-REFERENCE TO RELATED APPLICATIONS

This application is a continuation of U.S. patent application Ser. No. 12/969,282, filed on Dec. 15, 2010, entitled "Location Reporting Responsive to Transitions in Motional State of Wireless Equipment". The entirety of the foregoing application is incorporated herein by reference.

TECHNICAL FIELD

The subject disclosure relates to telecommunication and, more particularly, to location reporting based on motional conditions of wireless equipment.

BACKGROUND

Implementation of procedures for reporting location of mobile devices generally incurs a substantial amount of signaling in a wireless network and in the mobile device. Reporting location of a mobile device generally includes location area update at a wireless network that serves the mobile device. While idle, the mobile device scans for a change in location area broadcast by a cell site in which the mobile device is camping on. In such scenario, the change in location area causes the mobile device to transmit a location area update towards the wireless network through a first cell site detected by the mobile device. Updated location area information generally is utilized to route incoming pages towards a correct set of cell sites within the location area reported by the mobile device in response to the foregoing change. Yet, location area updates typically are concentrated on border cell sites, which are likely overloaded with signaling traffic. In addition, location area updates also affect battery life of the mobile device.

Location areas may contain several (e.g., $10$-$10^4$) cell sites. Yet, within such location areas there is no update, or network knowledge, of the actual location of the mobile device. Moreover, in certain buildings, mobile devices routinely select between disparate location areas and transmit related location area updates to several cell sites, even when the mobile devices are stationary within the buildings. Such reselection and updates, and related signaling load, is exacerbated by load-triggered cell breathing, wherein the wireless network that serves a mobile device effectively moves with respect the mobile device even though the mobile device may be in a static state.

Moreover, location areas generally are added in response to increases in network traffic and capacity demand in a wireless network increase; the added location areas commonly cover less area that extant location area and thus cause an increase in location area updates. As a result, signaling load and behavior is more dependent on the density of location area and mobility of a mobile device and less dependent on actual revenue-creating activity of an end user. In such scenarios, the accuracy, value and benefit of location area updates based on changes in location area are less than the incremental signaling load. In certain scenarios, a location area may have been enlarged to encompass several radio network controllers (RNCs) in order to reduce the number of disparate location areas and related updates caused by changes in location area. Yet, such location area configuration can exacerbate paging signaling load rather than reduce location area update signaling load. In addition, such location area configuration reduces the granularity, or resolution, of location awareness of the mobile device which can be useful for other applications or services.

Furthermore, reporting location of a mobile device generally includes delivery of a location or related information by the mobile device. Mobile devices typically have background applications that are executed to measure and report location towards a server in a wireless network on a regular basis. In certain scenarios, the mobile device can measure and report location nearly constantly or constantly. Such measuring and reporting consume battery resources and network resources available to the mobile device in order to collect and transmit the location or the related information. However, such location or related information not always is current or necessary for operation of the mobile device. In addition, reporting location of the mobile device from the mobile device generally is not utilized for call session routing; thus, any additional signaling load incurred by reporting location of the mobile device there from is in addition to signaling incurred for reporting location area changes. To mitigate the signaling overhead arising from such additional signaling, certain mobile device may be configures to report location in response, primarily, to a change in cell site, Wi-Fi SSID, or the like. Yet, while such approach may reduce the signaling overhead and overall signaling load in a wireless network, timeliness and accuracy of location reporting in mobile devices so configured can be reduced.

SUMMARY

The following presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. Its sole purpose is to present some concepts in a simplified form as a prelude to the more detailed description that is presented hereinafter.

One or more embodiments of the subject disclosure provide system(s) and method(s) that enable reporting of location of wireless equipment based at least on transition amongst motional states of the wireless equipment. Various data and metrics are employed for detection of at least one movement condition of wireless equipment to identify changes in a mobility profile thereof. One or more changes in the mobility profile can convey a change in motional state of the wireless equipment; analysis of the data and metrics enables determination of such change. While idle, the wireless equipment can monitor its mobility profile to identify changes in the motional state of the wireless equipment. Identification of certain changes in the motional state of the wireless equipment enable the wireless equipment to measure, report, and update location thereof. In an aspect, reporting of location of the wireless equipment includes location area reporting to a mobility switching center (MSC) for updating a network repository (e.g., visited location register (VLR)) and for voice call delivery. In another aspect, location reporting of the wireless equipment includes delivery of a current or nearly current location of the wireless equipment to a SGSN or mobility management entity (MME) for packet data delivery. In yet another aspect, location reporting of the wireless equipment includes delivery of location of the wireless equipment to a server that provides location-based services.

Compared to conventional telecommunication technologies, the subject disclosure provides various advantages. (1) For example, signaling associated with location update activity of a mobile device is reduced with respect to conventional telecommunication technologies. (2) For another example, current (e.g., real-time) or nearly-current location information becomes available for mobile device in quasi-static state or static state. (3) For yet another example, since different mobile devices generally transition from a dynamic state into a quasi-static state or static state at different locations under different cell sites or sector sites, impact on signaling load related to location reporting described herein is well distributed throughout a location area rather than being primarily localized at the border of the location area.

Aspects, features, or advantages of the subject disclosure are network and radio technology agnostic, and can be exploited in substantially any network and through most any or any wireless communication technology. For example, Wi-Fi (wireless fidelity), Worldwide Interoperability for Microwave Access (WiMAX); IS-95; Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA), or LTE Advanced. Additionally, substantially all or all aspects of the subject disclosure can include legacy telecommunication technologies.

To the accomplishment of the foregoing and related ends, the subject disclosure, then, comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

DETAILED DESCRIPTION

Figure 1:
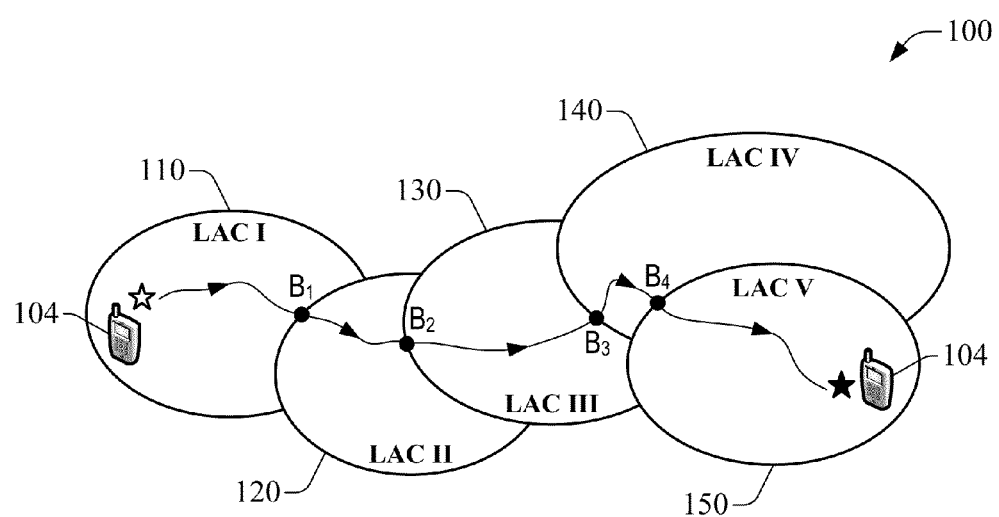
FIG. 1 represents an example scenario that illustrates various principles of location reporting according with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As employed in this specification and annexed drawings, the terms "component," "system," "platform," "interface," "node," "driver," "coder," "decoder," and the like are intended to refer to a computer-related entity or an entity related to an operational apparatus with one or more specific functionalities, wherein the such entities can be either hardware, a combination of hardware and software, software, or software in execution. One or more of such entities are also referred to herein as "functional elements." As an example, a component may be, but is not limited to being, a process running on a processor, a processor, a memory, a code object, an executable code instruction, a thread of execution, a program, and/or a computer. By way of illustration, both an application running on a server and the server can be a component. One or more components may reside within a process and/or thread of execution and a component may be localized on one computer and/or distributed between two or more computers. In addition, these components can execute from various computer readable media having various data structures or code instructions stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, node, driver, coder, decoder, layer, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP);" "base station," "Node B;" "evolved Node B (eNode B);" "home Node B (HNB)" or "home access point (HAP)," which include femtocell access point, picocell access point, Wi-Fi base station . . . ; and the like, are utilized interchangeably in the subject application, and refer to a wireless network component or apparatus that at least delivers and receives data, control, voice, video, sound, gaming, or substantially any or any data stream or signaling stream. Sources or recipients of such data, control, voice, video, sound, gaming, or substantially any or any data stream or signaling stream can be at least a set of network components such as, but not limited to, user equipment, customer premises equipment, or network servers, controllers, gateways or management components. It is noted that context in the subject specification generally distinguishes amongst a base station that provides or is intended to provide primarily outdoor wireless coverage and a facility-based access point (e.g., femtocell AP) that provides or is intended to provide primarily indoor wireless coverage or outdoor wireless coverage within a confined range. Explicit distinction between indoor-serving AP and outdoor-serving base station is made when context may be insufficient to distinguish the utilized terms.

Furthermore, the terms "user," "subscriber," "customer," "consumer," and the like are employed interchangeably throughout the subject specification, unless context warrants particular distinction(s) among the terms. It should be appreciated that such terms can refer to human agent(s) or automated component(s) supported through artificial intelligence (e.g., a capacity to make inference based on complex mathematical formalisms) which can provide simulated vision, sound recognition and so forth.

Further yet, the term "set" as employed herein excludes the empty set. Thus, a "set" in the subject disclosure includes one or more elements or entities. As an illustration, a set of devices includes one or more devices; a set of access points includes K access points with K a natural number greater than or equal to unity; a set of attributes spans one or more attributes; etc.

Features or aspects described in the subject disclosure can rely, at least in part, on delivery or reception of directive(s), indication(s), request(s), or the like, and information or payload data (e.g., content(s)) associated therewith. Directive(s) can be embodied in multi-bit words (e.g., P-bit words, with P a positive integer) and coded to specifically convey a request to a particular functional element (e.g., a femtocell AP) in order to execute one or more specific operation. Information or payload data within signaling, and request(s) or indication(s) conveyed therein, can be embodied, for example, in one or more reserved bits in a packet header, a light-payload (e.g., of the order of 1 byte) data packet, a predetermined multi-bit word conveyed in a control channel, a lightweight file (e.g., a cookie), an email communication, an instant message, or the like. In addition, directive(s), request(s), indication(s), notification(s), or the like, as described herein, can be delivered in accordance with various communication protocols. As an example, the various protocols can include at least one of file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), lightweight directory access protocol (LDAP), session initiation protocol (SIP), SIP for Instant Messaging and Presence Leveraging Extensions (SIMPLE), Open Mobile Alliance (OMA) device management (DM) protocol, Technical Report 069 (TR-069) protocol, also referred to as Customer Premise Equipment (CPE) Wide Area Network (WAN) Management Protocol or CWMP, or the like.

Various illustrative scenarios are set forth herein to represent example operational environments that exploit one or more features of communication routing based on femtocell present intelligence as described herein, and reveal the utility of such one or more features. The various illustrative scenarios are, of course, not exhaustive of the multiple operational environments in which the one or more features described in the subject disclosure can be exploited. In addition, the various illustrative scenarios and related examples are intended to be non-limiting, without restricting the applicability or utility of the various embodiments of systems and methods described herein, or any modification or variations thereof.

As discussed in greater detail below, various data and metrics are employed for detection of at least one movement condition of wireless equipment to identify changes in a mobility profile thereof. A change in the mobility profile can convey a change in motional state of the wireless equipment; analysis of the data and metrics enables determination of such change. While idle, the wireless equipment can monitor its mobility profile to identify changes in the motional state of the wireless equipment. Identification of certain changes in the motional state of the wireless equipment enable the wireless equipment to measure, report, and update location thereof at the network platform of a network operator that provides wireless service to the wireless equipment. A reported location of the wireless equipment (e.g., a mobile device) can be exploited for several location-based services.

With respect to the drawings, FIG. 1 represents an example scenario 100 that illustrates various principles of the subject disclosure. The example scenario 100 illustrates a trajectory of a mobile device 104 that relocates from an initial position $R_i$, represented with an open star in FIG. 1, to a final position $R_f$, represented with a solid star in FIG. 1. Initial velocity at initial position $R_i$ and final velocity at final position $R_f$ are both nearly zero or zero, whereas velocity at various positions within the trajectory can vary from zero to disparate finite values consistent with road conditions, such as speed limit, vehicular traffic density (e.g., traffic jam), traffic singularities (e.g., roadblocks, accidents, etc.) weather conditions, and so forth. The trajectory in the subject example scenario 100 involves five areas 110-150 identified with five disparate location area codes (LACs): LAC I, LAC II, LAC III, LAC IV, and LAC V—a wireless network (not shown) that serves the mobile device 104 identifies assigns the five LACs according to specific identification protocol(s). In addition, the illustrated trajectory includes four boundary crossings $B_1, B_2, B_3$, and $B_4$ (represented with solid circles in FIG. 1). It should be appreciated that other trajectories can have a disparate number of boundary crossings even in scenarios in the number of areas is maintained at five; for instance, trajectories with re-entry points have a larger number of crossing points. Further to FIG. 1 and scenario 100, it is to be appreciated and understood that same or similar boundary crossings associated with LACs can occur, for example, in relation to buildings (e.g., high-rise buildings) or other environments where two or more LAC boundaries are present.

Each of the five areas 110-150 represents a cell site, a sector site, or a non-macrocell-coverage area (e.g., a picocell, a femtocell, a microcell, Wi-Fi spot . . . ). Accordingly, in conventional telecommunication systems and related radio technology protocols, mobile device 104 performs a location update procedure, such as location area update (LAU) in 3GPP UMTS radio technology, upon or substantially upon reaching a boundary crossing $B_\kappa$, with $\kappa=1, 2, 3, 4$. The location update procedure can include monitoring network pilot signal, e.g., generated through a macrocell base station, while in the idle mode, wherein the network pilot signal includes a network location identifier (ID), such as LAC and/or RAC in 3GPP UMTS. As mobile device 104 effects the illustrated trajectory, and thus moves between disparate network pilots, e.g., moves within a macrocell sector associated with LAC II and reaches vicinity of a macrocell sector associated with LAC III, the mobile device 104 probes for a change in the network location ID, e.g., LAC or RAC. When mobile device 104 reaches a crossing point Bk, or vicinity thereof, mobile device 104 detects a change in the network location ID (e.g., LAC or RAC) and performs the location update procedure (e.g., LAU or RAU), in order for a wireless network that serves the mobile device 104 to become aware of the mobile device 104 location for the wireless network to route incoming call pages properly. Yet, as illustrated, mobile device 104 is in transit when located in areas 120, 130, and 140; therefore, likelihood of an incoming call session being effected while mobile device 104 occupies such areas is significantly smaller than the likelihood of an incoming call session being effected while the device is at area 110 or area 150. Therefore, battery consumption associated with signaling exchange with the wireless network that is part of performance of the location update procedure (e.g., LAU) at boundary crossings $B_\kappa$ represents inefficient consumption of battery resources and wireless network resources available to the mobile device 104.

In contrast, in the subject disclosure, location updates and related procedures are performed in response to changes in motional state rather than at boundary crossings. In an aspect, as mobile device departs the initial position Ri a transition from a quasi-static state or static state to a dynamic state is identified and, in response, location update procedures are halted until the a transition from the dynamic state to quasi-static state or static state is identified after the mobile device 104 reaches final position $_{Rf}$. In a situation in which an incoming call session is directed to the mobile device 104 while it is located in an area different from the area associated with the initial position $_{Ri}$, the wireless network, via a network node (e.g., mobility switching center (MSC)) therein, can exploit flood paging to deliver incoming pages for the mobile device 104. In the quasi-static state or static state associated with arrival at final position $_{Rf}$, the mobile device 104 performs location update with the wireless network to indicate current LAC (e.g., LAC V), for example. Implementation of location update procedure(s) based on transition on motional state of the mobile device 104 reduces signaling and thus mitigates or avoids inefficient battery consumption.

The subject disclosure exploits transitions amongst motional states of wireless equipment (e.g., mobile device 104) to effect location reporting in general, without restriction to location updates in the wireless network that serves the wireless equipment. In addition to location update (e.g., LAU in 3GPP UMTS), the location reporting that is responsive to transitions amongst motional states includes reporting location of the wireless equipment to SGSN or MME for packet data delivery, and reporting location of the wireless equipment towards a server that provides location-based services.

Figure 2:
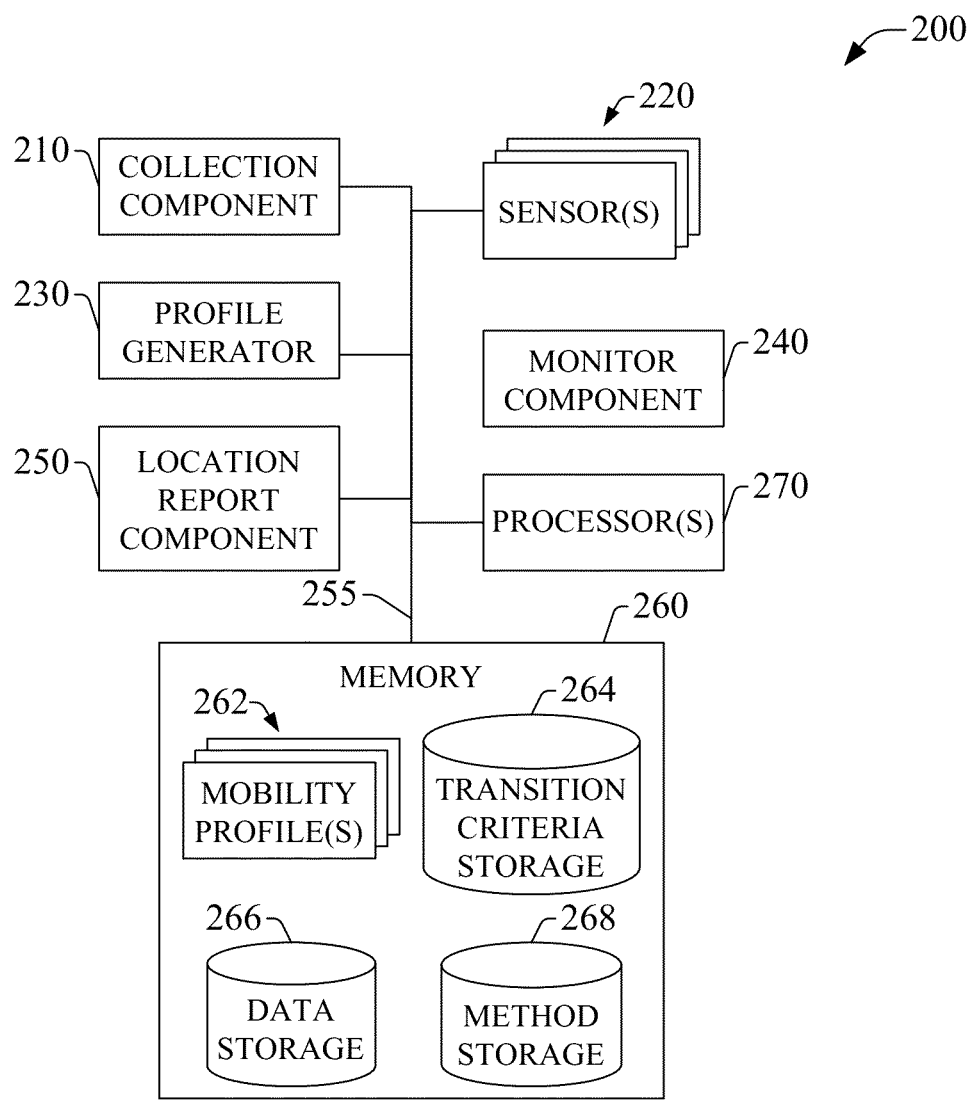
FIG. 2 illustrates an example system for reporting location of wireless equipment based at least on transition amongst motional states thereof in accordance with aspects of the subject disclosure.

FIG. 2 illustrates a block diagram of an example system 200 for reporting location of wireless equipment based at least in part on transition amongst motional states thereof in accordance with aspects of the subject disclosure. The wireless equipment generally is mobile (e.g., a mobile device) and various aspects of the subject disclosure are illustrated for a mobile device. The mobile device can be, for example, a cellular telephone (cellphone); a laptop computer with wireless connectivity card, netbook; a wearable computing device with wireless capability, such as a helmet mounted display; sensor to measure physiological data of a living organism (person, animal, etc.) that wears the wearable computing device; or the like. It should be appreciated, however, that location reporting as described herein also can be exploited for stationary or pseudo-stationary wireless equipment, such as customer premises equipment (CPE) that utilize wireless network resources to transmit voice or data wirelessly.

Example system 200 includes a collection component 210 that accesses (e.g., receives, retrieves, or otherwise acquires) data related to a mobility condition, or a motional state, of the wireless equipment. In an embodiment, collection component 210 can receive such data from at least one sensor of a group of one or more sensor(s) 220. The least one sensor of a set of one or more sensor(s) 220 can generate the data related to the motional state of the wireless equipment (e.g., mobile device), and the at least one sensor can supply such data to collection component 210. In an alternative or additional embodiment, the collection component 210 can retrieve (e.g., locate and gather) such data from a memory 260 or a memory element (database, register(s), file(s), etc.) therein, such as data storage 266. The at least one sensor also can supply the data to memory 260 or a memory element therein, such as data storage 266. The data related to the mobility condition of the wireless equipment (e.g., a mobile device) supplied by the group of one or more sensor(s) 220 can reveal values of dynamic variables such as time, position, velocity, acceleration, which can provide information related to the at least one movement condition. The data can be collected through various types of measurements, including (1) Doppler shift, which can convey rather accurately the velocity of wireless equipment in wireless environments that exploit narrow-band frequency channels; (2) GNNS time measurements; or the like. In addition, the data can include at least one metric and values thereof that can provide generally indirectly an indication of the at least one mobility condition; for instance, the metrics can include (A) 3GPP cell reselection count, which provides a low-resolution, qualitative assessment of movement condition(s), (B) automatic gain control (AGC) trending, and the like.

The at least one sensor that can supply data to collection component 210 or to memory 260, or memory elements therein, is specific to the wireless equipment that incorporates the example system 100. Generally, in an aspect, the type and number of sensors included in the group of one or more sensor(s) 220 are specific to such wireless equipment. The group of one or more sensor(s) 220 can include velocimeter(s), accelerometer(s), compass(es). In addition, the group of one or more sensor(s) 220 can include a radio communication platform (not shown) that collects data and signaling from a deep-space wireless link (e.g., satellite-based wireless link), and a chipset (e.g., an integrated circuit) that processes the data and signaling to produce data related to the motional state of the wireless equipment. The group of one or more sensor(s) 220 also can include kinetic generator(s) that can sense motion of the wireless equipment. Moreover, the group of one or more sensor(s) 220 also can include firmware sensors that exploit a processor to execute an application for collection of data related to operation of the wireless equipment. Such data can be part of or embody one or more metrics (e.g., cell reselection counts) that convey at least in part a mobility condition of such wireless equipment.

Example system 100 also includes a profile generator component 230, which in the subject disclosure is also referred to as profile generator 230. Based at least in part on the data related to the motional state of the wireless equipment, profile generator 230 updates a mobility profile that conveys the motional state of the wireless equipment. In an aspect, the mobile profile can be time dependent, such as more fully disclosed herein. Profile generator 230 can update the mobility profile in accordance with a predetermined schedule, or at a predetermined update rate $v_U = (\tau_U)^{-1}$, where $\tau_U$ is the update period. In an aspect, the update rate can be equal to or smaller than nearly the rate $v_D = (\tau_D)^{-1}$ at which data is updated, e.g., the smallest or substantially smallest measurement rate associated with a sensor in the group of one or more sensor(s) 220. In a scenario in which $v_U$ is smaller than $v_D$, profile generator 230 allows a data accumulation period in which data is collected without an update of the mobility profile. Such data accumulation period can enable reduction of noise in the data utilized to update the mobility profile.

As part of an update, the profile generator 230 can generate the mobility profile or modify an extant mobility profile. Generation of the mobility profile includes generation of a record (e.g., a field entry in table) of at least one of a state variable or a datum (e.g., a time, a position, a velocity, an acceleration, etc.) related to mobility condition of the wireless equipment. Modification of an extant mobility profile includes addition or removal of a record of at least one the state variable of a datum (e.g., a time, a position, a velocity, an acceleration, etc.) related to the mobility condition of the wireless equipment. Moreover, as part of an update, profile generator 230 retains the mobility profile in memory element 206; the mobility profile can be retained as part of a set of one or more mobility profile(s) 262. To generate a record of at least one of the state variable or the datum, profile generator can process at least a portion of data acquired from at least one sensor in the group of one or more sensor(s) 220. As part of such processing, profile generator 230 and apply at least one rule to the portion of data or to data that results from aggregating the portion of the data. In an aspect, outcome of the application of the at least one rule establishes a value of the state variable, wherein such value conveys the motional state of the wireless equipment. In addition, the profile generator 230 can aggregate the portion of data; aggregation of the portion of data enables analysis of mobility conditions of the wireless equipment. In certain embodiments, as indicated in a previous passage, a mobility profile includes a state variable indicative of the motional state of the wireless equipment. In alternative or additional embodiments, a mobility profile can include such state variable and at least one dynamic variable (e.g., position, velocity, or acceleration) representative of the dynamics of mobile device (e.g., trajectory of the mobile device).

In a scenario in which the wireless equipment is a mobile device, the mobility profile can convey the motional state of the mobile device through a state variable or a record thereof representative of such state. The state variable or a record thereof is part of the mobility profile and can be an M-ary variable—e.g., the state variable can adopt M values indicative of motional state; here, M is a natural number and M≥2. Values of the state variable are updated at a rate $v_U$. In an aspect, M=2 and the state variable is a binary variable that can adopt two values indicative of respective motional states. For example, a first value can be "Launch," which can be indicative of a dynamic state of (e.g., vehicular mobility condition) and a second value can be "Land," which can be indicative of quasi-static state (e.g., pedestrian mobility condition). In another aspect, M=3 and the state variable can adopt three values of respective motional states: (1) "Launch," (2) "Land," and (3) "Station," which can be indicative of a static state or a stationary condition (e.g., the wireless equipment is at rest in a position).

A monitor component 240 can monitor a mobility profile (e.g., a mobility profile in the group of one or more mobility profile(s) 262). As a result, monitor component 240 can generate a time series (or sampling) of a set of values of at least one variable in the monitor profile. Monitor component 240 can monitor de mobility profile in at least two modalities. In a first modality, monitor component 240 can subscribe to a service (e.g., a daemon in a mobile device with Linux-based OS) provided by profile generator 230. The service supplies historical values of at least one variable in the mobility profile, or current or last known values of the at least one variable. In a second modality, monitor component 240 can access (e.g., poll) the mobility profile with a predetermined access (e.g., polling) rate. In particular, yet not exclusively, monitor component 240 can monitor a state variable in the mobility profile. By monitoring the state variable, monitor component 240 can generate and analyze a time series (or sampling) of the state variable. As part of analysis of the time series, monitor component 240 can filter the time series to remove noise related to variations in the time-dependent values of the state variable. In an aspect, the filtering can be applied in highly dynamic scenarios in which the update rate $v_u$ is high. In addition, as part of the analysis of the time series, monitor component 240 perform trending of the time series in order to extrapolate prospective values of the state variable and, based on trending results, estimate stability (or persistence) of a current or nearly current motional state. Stability or persistence of a current or nearly current motional state can be determined based at least in part on at least one transition criterion retained in transition criteria storage 264. Furthermore, monitor component 240 can extract, or identify, at least one pattern in the time series, wherein the at least one pattern in the series enables identification of a net mobility condition or net motional state. Monitor component 240 can identify the at least one pattern through decomposition of the time series into Fourier components and magnitude thereof. In the alternative or in addition, monitor component 240 can identify the at least one pattern through various pattern recognition techniques, conventional or proprietary; such techniques can be retained in method storage 268.

With regard to net mobility condition or net motional state, such condition or state can be identified in relation to a desired (e.g., specified) period of time. For example, a person having a mobile device may be starting and stopping frequently while moving from one place to a destination in stop and go traffic. In such instance, even though the mobile device is observed to be stopping at certain times during the trip to the destination, the net motional state of the mobile device can be identified as dynamic state since the mobile device is moving to different locations over time. As another example, a person can have a mobile device on a desk and picks the mobile device up briefly as the person goes to get a cup of coffee in the break room, and then returns the mobile device to the desk within a relatively short period of time. In this instance, even though the mobile device was observed to be moved from the desk, the net movement of the mobile device was effectively nil since the mobile device was placed back in the same place (e.g., desk) after only being moved from that place for a short amount of time. As a result, in that instance, the net motional state of the mobile device can be identified as static state or quasi-static state, even though the mobile device was in fact moved for a short amount of time.

As time progresses, and in response to monitoring a state variable in the mobility profile, monitor component 240 updates (e.g., modifies) a time series for the state variable, wherein as described in preceding passages, the state variable conveys motional state of the wireless equipment (e.g., mobile device) that incorporates example system 100. Analysis of an updated time series for the state variable leads to an updated net motional state of the wireless equipment (e.g., mobile device). Accordingly, based on mobility aspects of the wireless equipment monitor component can identify changes from a first net motional state (e.g., represented by a first value $\Sigma_{old}$) for a first time series of the state variable to a second net motional state (e.g., represented by a second value $\Sigma_{new}$) for a second time series of the state variable. In response to a transition from the first net motional state to the second net motional state, monitor component can notify a location report component 250 of such transition. In an aspect, monitor component 240 can deliver a notification (e.g., signaling and related payload data) upon or substantially at an instant in which the transition from $\Sigma_{old}$ to $\Sigma_{new}$ is identified, or at an instant after such transition is identified. In an aspect, as desired, the location report component 250 can estimate location of the mobile device through measurements and analysis of data collected through the measurements, for example, when a mobility profile change occurs.

In response to reception of a notification indicative of a transition from a first net motional state to a second net motional state, location report component 250 can report location of the wireless equipment (e.g., mobile device) that incorporates example system 100, based on such transition, or variation of the motional state of the wireless equipment.

As an example, when transition from the first net motional state to the second net motional state represents transition from a quasi-static state (e.g., pedestrian mobility condition) or a static state to a dynamic state (e.g., vehicular mobility condition), location report component 250 can interrupt at least one procedure for reporting location of the wireless equipment (e.g., mobile device). In a scenario in which such transition occurs, location report component 250 can halt LAU procedures in response to change in LAC, service set identifier (SSID), or other network location identifier (ID). In certain embodiments, however, location report component 250 can interrupt LAU procedure(s) in response to change in any network location ID except public land mobile network (PLMN) ID since a change in PLMN ID entails change in network operator. In the subject disclosure, LAU procedures are halted in the dynamic state since current or nearly current location update information (e.g., LAC or other network ID) is likely to become obsolete prior to an incoming call session directed to the wireless equipment is established—as mentioned in a previous passage, typical wireless equipment is in idle state for up to about 90% of its operational time. In the subject disclosure, incoming call sessions, or incoming calls, include voice communications and data communications, such as multimedia communications (video call, text message, audio communication, data communication, etc.).

In addition, while the wireless equipment (e.g., mobile device) remains in the dynamic state (e.g., vehicular mobility condition), incoming call sessions directed to the wireless equipment are conducted according at least in part to flood paging. A mobility management (MM) component in a network platform delivers incoming pages to a first network location ID (e.g., LAC) associated with a location in which the motional state of the wireless equipment was quasi-static state (e.g., pedestrian mobility) or static state; the first network location ID can be the last known network location ID for the wireless equipment. If a first incoming page delivered to the wireless equipment fails then the MM component delivers incoming pages (including the first incoming page) to a network location ID adjacent to the first LAC via flood paging as employed in typical paging implementations in 3GPP wireless networks. After flood page response, e.g., the incoming call session is established (for example, a voice call is received) the MM component, or a network node functionally thereto, updates a record of location of the wireless equipment in a network repository (e.g., Visited Location Register (VLR)) when the MM component receives a page response from the network location ID (e.g., LAC) in which the wireless equipment (e.g., mobile device) is located. The record of the location of the wireless equipment (e.g., mobile device) embodies the last known network location ID (e.g., LAC) and subsequent incoming pages are delivered (through the MM component, for example) to such last known network location ID. It is noted that the MM component can be specific to the radio technology implemented for telecommunication through the network platform; for instance, in 3GPP LTE networks, the MM component can be embodied in a mobility management entity (MME), whereas in the 3GPP UMTS network, then MM component can be embodied in a mobility switching center (MSC).

In the subject disclosure, through interruption of location update procedures in response to transition to a dynamic state (e.g., vehicular mobility), signaling associated with such location update procedures and related location update activity of the wireless equipment is reduced with respect to conventional telecommunication technologies. Such reduction is accomplished through at the expense of adding flood paging and related signaling to ensure an incoming call session directed to the wireless equipment can be established in the dynamic state.

As another example, when transition from the first net motional state to the second net motional state represents transition from the dynamic state (e.g., vehicular mobility condition) to the quasi-static state (e.g., pedestrian mobility condition) or the static state, location report component 250 can initiate at least one procedure for reporting location of the wireless equipment (e.g., mobile device). In a scenario in which such transition occurs, location report component 250 can trigger a LAU procedure to update the LAC, (SSID), or other network location ID in which the wireless equipment is located after the transition. As a result of such update, a network of platform of a network operator that provides wireless service to the wireless equipment acquires information (e.g., network location ID, such as LAC) indicative of a cell site or sector site that serves the wireless equipment (e.g., mobile device). The wireless equipment is likely to remain in the cell site or the sector site for a period sufficiently long to establish incoming call session(s) in the quasi-static or static state. Incoming initial pages are directed, via a MM component, to the cell site or the sector, but flood paging also is possible in case an initial incoming page fails. The wireless equipment (e.g., mobile device) remains in the quasi-static state or the static state until it transitions back to the dynamic state (e.g., vehicular mobility condition).

According to an aspect of the subject disclosure, a wireless equipment (e.g., a mobile device) that remains in a quasi-static state (e.g., pedestrian mobility condition) or static state within a confined area, such as a high-rise building, can avoid performing LAU procedure(s) even when the wireless equipment detects several different network location IDs (e.g., LACs) and reselects amongst them. It should be appreciated the confined area also can be embodied in other confined spaces with disparate architectural features; for example the confined spaces can include (1) residential dwellings (e.g., a single-family home or an apartment); (2) business spaces (e.g., a hotel); (3) enterprise places of operation; (4) factories; (5) entertainment areas which can include bars, night-clubs, or the like; (6) worship areas such as a church or mosque; (7) educational facilities, which can include open and semi-open spaces as it may be the case in a college campus; (8) wellness areas, e.g., a health club; (9) hospitals or nursing homes; or the like.

In certain embodiments, a location reported by location report component 250 can be exploited in location based services, such as advertisement or coupons based on location, content (news, weather conditions, etc.) delivery based on locations, location broadcasting for emergency services and CALEA reporting, etc. Transition to a quasi-static state or a static state can provide sufficient spatial resolution for most any location based services without dedicated measurement or location determination procedures. In addition, in view of persistence of a net motional state, a location reported by location report component 250 can provide a meaningful spatial reference for most any location services. Reporting of such location can leverage a particular wireless environment, such as a local area network (LAN), to provide customized location based services. For example, in a scenario in which a mobile device is determined, via inspection of a related mobility profile, to have transitioned to a quasi-static state, location report component 250 can scan the wireless environment for signaling indicative of a LAN (e.g., picocell, femtocell, Wi-Fi deployment, etc.) and identity of the LAN owner, which can be broadcasted through pilot messages radiated from an access point of the LAN. If the LAN owner is identified to be a business (e.g., a convenience store or coffee shop adjacent to a highway road), then the location report component 250 can signal a network node (e.g., a server in a service network platform) information related to the business. In response, the network node can provide specific content (advertisement, coupons, media, etc.) to the mobile device as part of a location service to which the mobile device is subscribed. As described supra, for location based services, variation in the motional state of the wireless equipment also can be employed to interrupt and resume location reporting based on aspects of such variation as described hereinbefore.

Example system 200 also includes processor(s) 270 which represent a set of one or more processors configured to enable or that enable at least part of the functionality of one or more components or sensors of example system 200. To implement or enable at least part of the described functionality of the one or more components or sensors of example system 200, processor(s) 270 can execute one or more sets of computer-executable instructions (not shown) stored in memory 260. The one or more sets of computer-executable instructions can include program modules or software applications or firmware applications that, when executed by the processor(s) 270, cause the processor(s) 270 to perform the functionality of example system 200. In an aspect, the one or more set of computer-executable instructions embody at least one of the example methods described in the subject specification and that are associated, at least in part, with functionality of example system 200.

While illustrated as stand-alone functional element(s), in certain embodiments of example system 200, the one or more processor(s) can be distributed amongst two or more components of example system 200 or two or more sensors of the set of one or more sensor(s) 220 to provide at least part of the described functionality thereof.

Additionally, in an alternative or additional embodiment, one or more components of example system 200 or at least one sensor of the set of one or more sensor(s) 220 can reside, at least in part, within memory 260 as one or more sets of computer-executable code instructions. The one or more sets of computer-executable instructions can include program module(s) or software application(s) or firmware application(s) that, when executed by the one or more processors (not shown), implement specific tasks which can be accomplished through at least one of the example methods described in the subject specification and that are associated, at least in part, with functionality of the example system 200. The one or more processor(s) are configured to execute the one or more sets of computer-executable instructions. In response to execution by the one or more processor(s), the one or more sets of computer-executable instructions implement the one or more components of example system 200 or the at least one sensor of the set of one or more sensor(s) 220, and the described functionality thereof.

In accordance with various embodiments, as desired, the wireless equipment (e.g., mobile device) can be configured to include a learning mode, wherein, as desired, the wireless equipment can be set in learning mode to observe and identify recurring usage patterns (e.g., usage of the wireless equipment on a regular travel route from home to work, usage of the wireless equipment while in the office building, usage of the wireless equipment over a specified period of time each weekday or over the weekend, etc.) relating to the wireless equipment and can produce respective state variable values for respective net motional states associated with the respective identified usage patterns, wherein such usage patterns and state variable values can be employed to facilitate desirable (e.g., optimal or improved) reporting of location of the wireless equipment in relation to transition amongst motional states of the wireless equipment.

Figure 3:
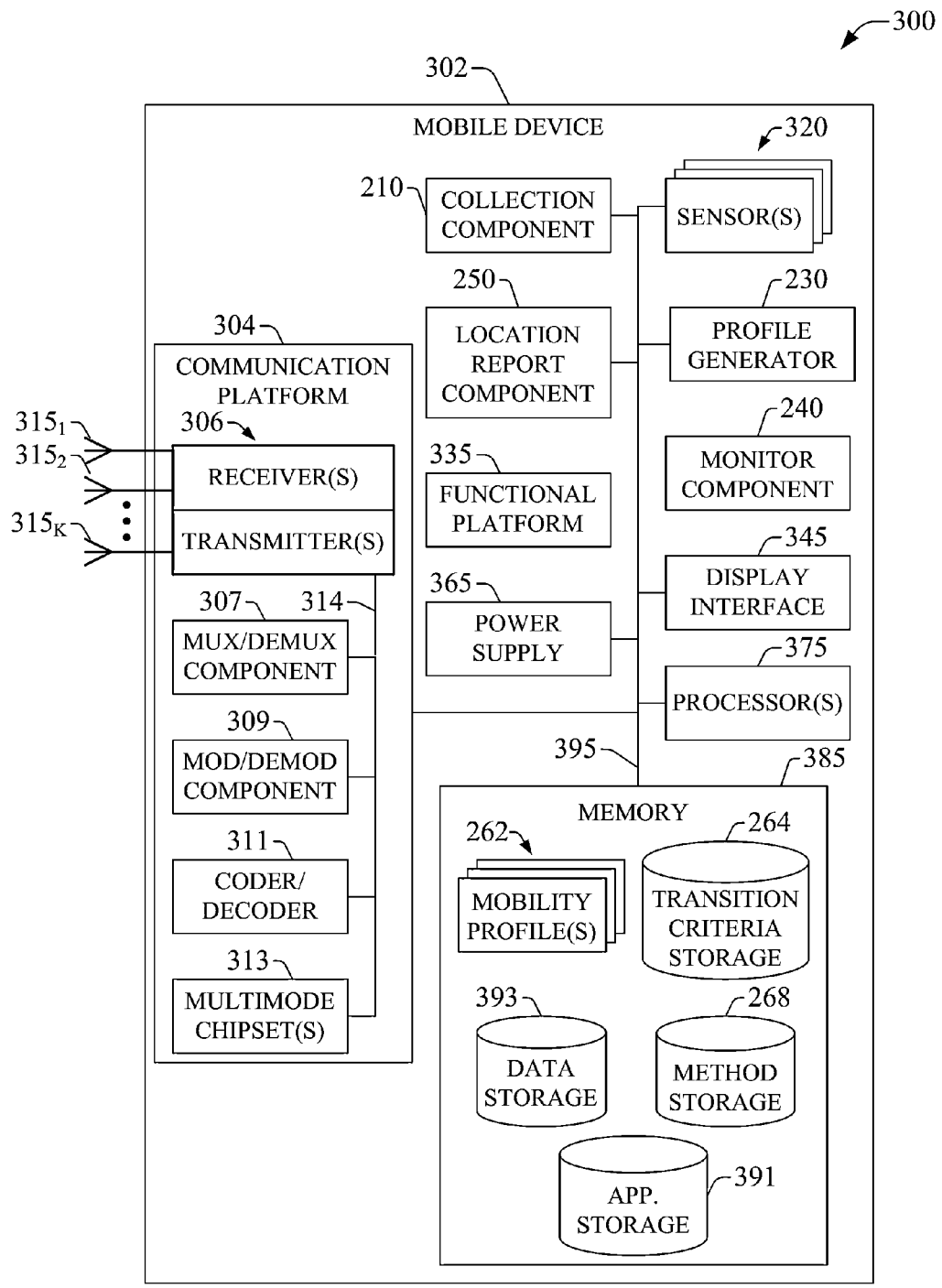
FIG. 3 illustrates an example embodiment of a mobile device enables and exploits reporting of location in response to transitions amongst motional states of the mobile device in accordance with aspects of the subject disclosure.

Example system 200 can be embodied in a stand-alone apparatus that is functionally coupled to a mobile device. In the alternative or in addition, one or more components, or functional elements, of example system 200 can be integrated in a mobile device. FIG. 3 illustrates a block diagram of an example embodiment 300 of a mobile device 302 that incorporates, or integrates, example system 200. Through integration of example system 200, the mobile device 302 enables reporting of location in response to transitions amongst motional states in accordance with aspects of the subject disclosure. Mobile device 302 embodies any wireless equipment that exploits the various features of location reporting in response to transitions amongst motional states as described herein. To enable wireless communication, and transmit and receive data and signaling wirelessly, mobile device 302 includes a communication platform 304, which comprises a set of receiver(s)/transceiver(s) 306; each transceiver in the set includes an antenna $315_\lambda$, with $\lambda=1, 2, \ldots K$, with K a natural number greater or equal than unity. One or more of receiver(s)/transmitter(s) 306 can be configured, e.g., by a base station or component(s) therein, to operate in various telecommunication modes: MIMO mode, MISO mode, SIMO mode, or SISO mode. Receiver(s)/transmitter(s) 306 include respective filter(s) and amplifiers. The filters are installed between antenna(s) $315_\lambda$ and the amplifier(s), and tune specific portions of electromagnetic (EM) radiation spectrum available for telecommunications.

Communication platform 304 comprises electronic components and associated circuitry that enable processing and manipulation, e.g., coding/decoding, deciphering, modulation/demodulation, of wireless signal(s) received by mobile device 302 and wireless signal(s) to be transmitted by mobile device 304; the wireless signal(s) modulated and coded, or otherwise processed, in accordance with various radio technology protocols. Components, or functional elements, in communication platform 304 exchange information through a bus 314; information includes data, code instructions, signaling, or the like, and the bus 314 can be embodied in at least one of a system bus, and address bus, a data bus, a message bus, or a reference link or interface. The electronic components and circuitry can include the set of K receiver(s)/transmitter(s) 306 and component(s) therein, a multiplexer/demultiplexer (mux/demux) component 307, a modulator/demodulator component 309, a coder/decoder 311, and a set of one or more chipsets, e.g., multimode chipset(s) 313. As indicated above, the transceivers includes receiver(s)/transmitter(s) 306 that can convert signal from analog to digital upon reception, and from digital to analog upon transmission. Receiver(s)/transmitter(s) 306 also can divide a single data stream into multiple parallel data streams, or perform the reciprocal operation; such operations typically conducted in various multiplexing schemes. Functionally coupled to receiver(s)/transmitter(s) 306 is a multiplexer/demultiplexer (mux/demux) component 307 that enables processing or manipulation of wireless signal(s) in time and frequency space or domain. Electronic mux/demux component 307 can multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 307 can scramble and spread information (e.g., codes) according to substantially any code; e.g., Hadamard-Walsh codes, Baker codes, Kasami codes, polyphase codes, and so on. A modulator/demodulator (mod/demod) component 309 also is a part of communication platform 304, and can modulate and demodulate information according to various modulation techniques, such as frequency modulation (e.g., frequency-shift keying), amplitude modulation (e.g., N-ary quadrature amplitude modulation (QAM), with N a positive integer; amplitude-shift keying (ASK)), phase-shift keying (PSK), and the like. In embodiment 300, mod/demod component 309 is functionally coupled to mux/demux component 307 via bus 314. In addition, processor(s) 375 enables, at least in part, mobile device 302 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 304 also includes a coder/decoder 311 that operates on data in accordance with one or more coding/decoding schemes suitable for telecommunication through one or more receivers(s)/transmitter(s) 304. When communication platform 304 exploits MIMO, MISO, SIMO modes of operation, coder/decoder 311 can implement at least one of space-time block coding (STBC) and associated decoding; or space-frequency block (SFBC) coding and associated decoding. Coder/decoder 311 also can extract information from data streams coding in accordance with spatial multiplexing scheme. To decode received information, e.g., data or control signaling, coder/decoder 311 can effect at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. In addition, to operate in the manner described herein, coder/decoder 311 can employ, at least in part, mux/demux component 307 and mod/demod component 309.

A network operator can configure, as part of provisioning of mobile device 302, a set of electromagnetic (EM) radiation frequency bands and a set of radio technologies that communication platform 304 and components therein can exploit for wireless communication. The set of EM radiation frequency bands, also referred to herein as frequency bands, can comprise radio frequency (RF) portion(s) and microwave portion(s) of the EM spectrum, although other spectral regions such as infrared (IR) also can be included. In an aspect, the set of EM radiation frequency bands can include at least one of (i) all or substantially all EM frequency bands licensed by the network operator (e.g., PCS bands, AWS bands, GWCS bands, and so forth); or (ii) all or substantially all unlicensed frequency bands currently available for telecommunication (e.g., the 2.4 GHz Industrial, Scientific and Medical (ISM) band or one or more of the Unlicensed National Information Infra-structure (UNIT) bands in the 5 GHz range). It is noted that as part of network upgrades, the network operator can add frequency bands, or frequency carriers therein, to the set of EM radiation frequency bands as such bands or carriers become available for telecommunication, e.g., auctioned for utilization or authorized for free-of-charge utilization. Similarly, as new radio technologies become standardized, or available, the network operator can introduce such technologies in the set of radio technologies that can be utilized for telecommunication by mobile device 302.

Additionally, in embodiment 300, multimode chipset(s) 313 can allow mobile device 302 to operate in multiple communication modes through various radio network technologies (e.g., second generation (2G), third generation (3G), fourth generation (4G)) or deep-space satellite-based communication in accordance with disparate technical specifications, or standard protocols, for the radio network technologies or satellite communication. In an aspect, multimode chipset(s) 313 can enable, at least in part, communication platform 304 to operate in accordance with standard protocols specific to a telecommunication mode of operation, e.g., 3GPP Long Term Evolution (LTE)-based communication. In another aspect, multimode chipset(s) 313 can be scheduled to operate concurrently (e.g., when K>1) in various modes or within a multitask paradigm in which the multimode chipset(s) 313 operates in a dedicated mode for a specific time interval. In yet another aspect, multi-mode chipset(s) enable communication platform 304 to receive global positioning system (GPS) pilot signals, e.g., timing message(s), orbit information, from one or more deployed global navigation satellite systems (GNSSs).

Communication platform 304 can exchange (e.g., received and transmit) signaling with at least one base station (e.g., an eNode B or other type of macrocell base station), and deliver information related to location of the mobile device 302. For example in UMTS-based radio technology, communication platform 304 also can deliver a notification of location area update (LAU) or a notification of routing area update (RAU). For example, communication platform 304 collect network pilot signal, e.g., generated through a macrocell base station, that is monitored by mobile device 302 while in the idle mode; the network pilot signal includes LAC and/or RAC, or other a network location ID. In addition or in the alternative, communication platform 304 can enable, at least in part, measurement of location of the mobile device (e.g., via collection of GNSS timing messages, or pilot signals related to time-of-flight measurements, etc.), and deliver the location of the mobile device.

Display interface 345 also can render visual or aural indicia that control functionality of mobile device 302 as supplied through functional platform 335, or reveal operational conditions of mobile device 302; for example, battery level, radio technology employed for communication, or the like. Display interface 345 can receive and process (e.g., decode, encode, format, or deliver) data from a subscriber via one or more gestures (e.g., touch, speech, motion). Various functional elements and associated circuitry that can embody, at least in part, display interface 345 enable data input through the one or more gestures (e.g., touch, speech, motion), one or more communication protocols. Such functional elements can include a keypad, a touch screen, a microphone, a camera(s); a bar code reader, radio frequency ID (RFID) reader, infrared (IR) wireless-based reader; or the like.

In addition, display interface can be functionally coupled to a peripheral interface (not shown) in the mobile device 302, wherein the peripheral interface enables connection to a peripheral device and communication therewith. As an example, the peripheral interface (not shown) can allow connection of an external antenna to receive global navigation data, e.g., global positioning system (GPS) data, so the antenna is exposed to open sky. Such antenna can reside in a structure neighboring the mobile device 302; for instance the antenna can be in the dashboard of a vehicle that carries the mobile device 302. As another example, peripheral interface 1512 can enable connection to disparate femto AP(s). In an aspect, peripheral interface 1512 can include a set of ports, which comprises at least one of parallel ports, serial ports, Ethernet ports, V.35 ports, X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

Further to enabling wireless communication of voice or data, mobile device 302 can provide a specific functionality; for instance, device 302 can be a mobile phone, a photography camera, a video camera, a wireless dedicated computer (such as a device in an industrial environment), a navigation device, a printer or photocopier, a scanner, a fax machine, a television set, a digital picture frame, or the like. Such specific functionality can be supplied primarily through a functional platform 335 that comprises a set of components (not shown) that enable, at least in part, one or more specific functionalities that can complement or supplement wireless communication. It should be appreciated that functional platform 335 can exploit an application (either a software application or a hardware application) retained in application storage 391 in order to provide one or more functionalities of mobile device 302; the application is retained as one or more sets of code instructions. As an example, in an aspect of the subject innovation, application storage 391 can include an application that, when executed, can provide tutorial(s) for operation of mobile device 302. As another example, when mobile device 302 is a telephone, functional platform 335 can include functional elements such as a data entry interface (e.g., a touch screen, a keyboard, a biometric pad for biometric-based access, a microphone, a loud speaker), a camera, peripheral connectors (e.g., a universal serial bus (USB) port or an IEEE 1394 port for transferring data to, or exchanging data with, a disparate device), a voice coder-decoder, which can be part of coder/decoder 311; intelligent component(s) that can respond to voice activated command(s); and so on.

Mobile device 302 includes processor(s) 375 configured to enable or that enable, at least in part, functionality to substantially any or any component(s) or platform(s), interface(s), and so forth, within mobile device 302 in accordance with one or more aspects of the subject disclosure. In embodiment 300, processor(s) 375 is illustrated as external to the various functional elements (e.g., component(s), interface(s), platform(s)) of mobile device 302; however, in additional or alternative embodiments, processor(s) 375 can be distributed amongst a plurality of such various functional elements. Processor(s) 375 is functionally (e.g., communicatively) coupled to each functional element within mobile device 302 and to memory 385 through bus 395, which can be embodied in at least one of a memory bus, a system bus, an address bus, a message bus, or one or more reference link(s) or interface(s). In addition, processor(s) 375 can supply information to and retrieve information from memory 385, wherein the information can enable, at least in part, operation and/or can provide, at least in part, functionality to communication platform 304 and at least a portion of component(s) therein; presence client component 325; configuration component 332 and component(s) therein; functional platform 335 and component(s) therein; as well as other operational components (not shown) of mobile device 302. The information can include at least one of code instructions, code structure(s), data structures, or the like.

Processor(s) 375 can execute computer-executable instructions stored in memory 385, for example within application storage 391, or other memory(ies) functionally coupled to mobile device 302, to provide the described functionality of mobile device 302. Such code instructions can include program modules or software applications or firmware applications that implement various methods described in the subject disclosure and that are associated, at least in part, with described functionality of mobile device 302.

Memory 385 can retain, at least in part in an application storage 391, at least one of data structures (e.g., objects, classes, metadata); code structure(s) (e.g., modules, procedures) or instructions; or substantially any type of software or firmware that processor(s) 375 can execute to provide functionality associated with substantially any or any component(s), platform(s), interface(s), or functional element(s) within mobile device 302 in accordance with aspects of the subject innovation. In addition, memory 285 can store network or device information, e.g., within data storage 393, such as encoded pilot signal(s); one or more communication protocol(s) or technical specification(s); code sequences for scrambling or spreading; blind decoding hypotheses; semi-persistent scheduling parameters; frequency offsets, macro-cell and femtocell identifiers (IDs); address book(s); or the like. Moreover, memory 385 can retain content(s) such as multimedia files or subscriber-generated data; security credentials (e.g., passwords, encryption keys, digital certificates, biometric keys such as voice recordings, iris patterns, fingerprints, deoxyribonucleic acid (DNA) profiles); hardware identifying tokens or codes such as at least one of an IMSI, a temporary mobile subscriber identity (TMSI), packet TMSI (P-TMSI), an IMEI, an MDN, a MIN, a TIA ESN, or a multi-bit identification number such as MEID. It is noted that memory 385 can include affixed or removable elements such as a subscriber identification module (SIM) card storage, a universal integrated circuit card (UICC) storage, or a removable user identity module (RUIM).

Mobile device 302 also includes power supply 365, which can provide power to one or more components or functional elements that operate within mobile device 302. In an aspect, power supply 365 can be rechargeable, e.g., it can be embodied in a rechargeable battery. In addition, power supply 365 can include one or more transformers to achieve power level(s) that can operate mobile device 302 and components or functional elements, and related circuitry therein. In an aspect, power supply 365 can attach to a conventional power grid to recharge, or ensure mobile device 302 is operational; power supply 365 can include input/output (I/O) interface(s)

(not shown), or connector(s) (not shown), to functionally attach to the conventional power grid. Power supply 365 also can include an energy conversion component(s) (not shown) such as a solar panel or a thermoelectric device or material, which can be external or internal to the mobile device 302, in order to provide additional or alternative power resources or autonomy to mobile device 302.

Figure 4:
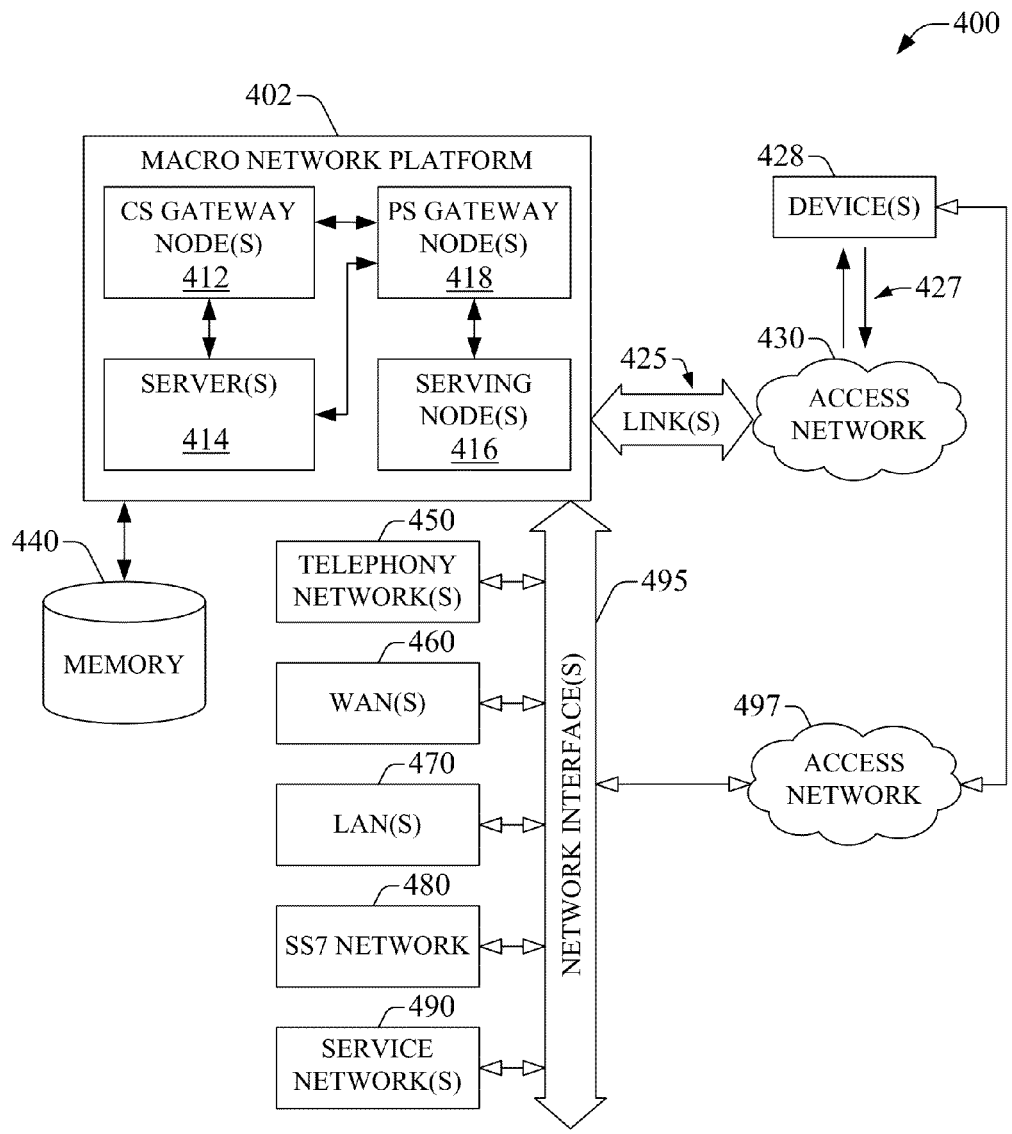
FIG. 4 presents an example network environment that can exploit various aspects of the subject disclosure.

FIG. 4 presents a high-level block diagram of an example network environment 400 that can enable exploitation of various aspects described in the subject disclosure. Macrocell (macro) network platform 402 can include one or more functional elements, e.g., component(s), node(s), gateway node(s), interface(s), server(s), or platform(s) that enable both packet-switched (PS) (e.g., internet protocol (IP), frame relay, asynchronous transfer mode (ATM)) and circuit-switched (CS) traffic (e.g., voice and data) and control generation for networked communication, wireless or otherwise. It should be appreciated that in cellular wireless technologies (e.g., 3GPP UMTS, HSPA, 3GPP LTE, 3GPP UMTS, 3GPP2 UMB), macro network platform 2810 embodies a core network. PS gateway node(s) 418 can embody at least part the PS domain. Functional element within the PS domain can enable exchange of notifications, indications, and directives in accordance with various networked communication protocols indicated herein, including one or more peer-to-peer transport protocol(s). With respect to CS communication, macro network platform 108 includes CS gateway node(s) 412, which can interface CS traffic received from legacy networks like telephony network(s) 450 (e.g., public switched telephone network (PSTN), or public land mobile network (PLMN)) or a SS7 network 480. CS gateway node(s) 412 also can enable exchange of messaging communications in SMS protocol. In addition, CS gateway node(s) 412 can authorize and authenticate traffic (e.g., voice) arising from such networks. Moreover, CS gateway node(s) 412 can access mobility, or roaming, data generated through SS7 network 460 in response to various mobility events as described herein; for instance, the mobility data can be stored in a VLR, which can reside in memory 440. Furthermore, CS gateway node(s) 412 can interface CS-based traffic or signaling with PS gateway node(s) 418. As an example, in a 3GPP UMTS network, CS gateway node(s) 412 can be embodied, at least in part, in gateway GPRS support node(s) (GGSN).

In the subject disclosure, in addition to receiving and processing CS-based traffic and signaling data, PS gateway node(s) 418 can authorize and authenticate PS-based data sessions (e.g., an incoming call) with device(s) 428 served through access network 430 via link(s) 425 and link(s) 427, which include wireline links (e.g., reference links) or wireless link(s) (e.g., line-of-sight (LOS) links). Device(s) 428 is a set of devices that includes wireless device(s), wireline device(s), or a combination thereof. For example, device(s) 428 can include at least one mobile device (e.g., mobile device 104, mobile device 302) that reports location or location area updates in accordance with aspects described herein.

Access network(s) 430 can include one or more components that enable transmission of data and signaling, including related payload data, amongst device(s) 428 and macro network platform 402; access network(s) 420 can be part of access network(s) 152 and operate in substantially the same or the same manner thereof. Access network(s) 430 can include a radio access network (RAN), and associated component(s). The RAN comprises one or more outdoor-based (or outdoor) base stations, and associated electronic circuitry, and respective deployment site(s) of the one or more outdoor base stations. In addition, the RAN includes the air-interface, which comprises a least one wireless radio link operated in accordance with the base station(s) radio technology. It should be noted that the RAN comprises various coverage cells. For a wireless device served by base station(s) (not shown), one or more network components that are part of a radio access network in access network 430 enable transmission of data and signaling. For wireline devices, one or more components that are part of a wireline network (e.g., service network(s) 490) enable the transmission of data and signaling. Link(s), represented with open arrows, operationally connected to network interface(s) 495 can deliver data and signaling to the wireline device via the one or more components of the wireline network, for example represented by access network 497, and related link(s) represented with open arrows connecting the access network 497 to device(s) 428. Data sessions (e.g., an incoming call) can include traffic exchange with networks external to network platform 410, such as wide area network(s) (WAN(s)) 460 or service network(s) 490; local area network(s) (LAN(s)) 470 (e.g., enhanced 911) also can be interfaced with macro network platform 402 through PS gateway node(s) 418. Network interface(s) 495 enable the traffic exchange; such interface(s) can include conventional wireline or wireless links, or reference links specific to each of the external network(s) that interface with PS gateway node(s) 418, or other portions of the PS domain in macro network platform 108. In an aspect, PS gateway node(s) 418 can generate packet data protocol (PDP) contexts when a data session is established. To at least that end, in an aspect, PS gateway node(s) 418 can include a tunnel interface (e.g., tunnel termination gateway (TTG) in 3GPP UMTS network(s) (not shown)) which can facilitate packetized communication with disparate wireless network(s), which can be part of access network(s) 420 and can include Wi-Fi networks, femtocell network(s), macrocell network(s) and associated radio access network(s) (RAN(s)) based on various radio technology generations, etc. It should be further appreciated that packetized communication can include multiple flows of data that can be generated through server(s) 414, such as management server(s) (e.g., a provisioning server, a MSC) or application server(s). It is to be noted that in 3GPP UMTS network(s), PS gateway node(s) 418 (e.g., GGSN) and tunnel interface (e.g., TTG) comprise a packet data gateway (PDG).

In network environment 400, macro network platform 402 also includes serving node(s) 416 that conveys the various packetized flows of data streams that can be directed to device(s) 428, and that are received through PS gateway node(s) 418 from server(s) 414. In turn, server(s) 414 can receive the communication(s), such as request for data intended to service network(s) 480, which can include an IMS core or other packet-based cores, from user equipment within device(s) 428 or network elements (e.g., a server that provides location-based services). As an example, in a 3GPP UMTS network, serving node(s) 416 can be embodied in serving GPRS support node(s) (SGSN). As another example, in a 3GPP LTE network, service node(s) 416 can be embodied in a Mobility Management Entity (MME).

Server(s) 414 can operate in various layers of macro network platform 108. For example, server(s) 414 can operate as part of Operations Support Systems (OSS), Business Support Systems (BSS), or network subsystems such as IMS core network. Server(s) 414 can execute numerous applications, which can include consumer-oriented application(s), such as messaging services, location services, online gaming, wireless banking, or system-oriented applications, e.g., wireless device management, scheduling or queuing of network traffic, or the like. Such application(s), either consumer-oriented or system-oriented, can generate sets of packetized data streams or flows, and manage (e.g., schedule, queue, format . . . ) such flows. Such application(s), for example can include add-on features to standard services provided by mobile network platform 410; in an aspect, the add-on features can include the customized communication processing described herein. Data streams generated by server(s) 414 can be conveyed to PS gateway node(s) 418 for authentication/authorization and initiation of a data session (e.g., an incoming call), and to serving node(s) 416 for communication to device(s) 428 thereafter.

Server(s) 414 also can effect security (e.g., implement one or more firewalls) of macro network platform 108 to ensure network's operation and data integrity in addition to authentication and authorization procedures that CS gateway node(s) 412 and PS gateway node(s) 418 can enact. In addition, server(s) 414 can implement timing protocols (e.g., Network Time Protocol (NTP)) that supply timing framework(s) for various operation(s) of macro network platform 108. Moreover, server(s) 414 can provision services from external network(s), e.g., WAN 460, LAN(s) 470, IMS core network, which can be part of service network(s) 490, or Global Positioning System (GPS) network(s) (not shown). Server(s) 414 can include one or more processors (not shown) configured to provide or that provide, in part, the functionality of macro network platform 108. To that end, the one or more processors can execute one or more sets of code instructions (not shown) stored in memory 440, for example.

In example network environment 400, memory 440 can store information related to operation of macro network platform 402. Information can include content(s), such as subscriber-generated content or from various other sources; subscriber account(s) and associated credential(s); pricing schemes, e.g., promotional rates, flat-rate programs, couponing campaigns; and so forth. In addition, memory 440 can store information from at least one of telephony network(s) 450, WAN(s) 460, LAN(s) 470, SS7 network 480, or service network(s) 490. While illustrated as a single entity, memory 440 can be distributed amongst one or more of the described external networks, server(s) 414, or other functional elements of network platform 410. Memory 440 can be embodied at least in part in a VLR, a HSS, or storage available within a consolidated data repository that centralizes data (administrative data, operational data, etc.) for at least macro network platform 108.

Figure 5:
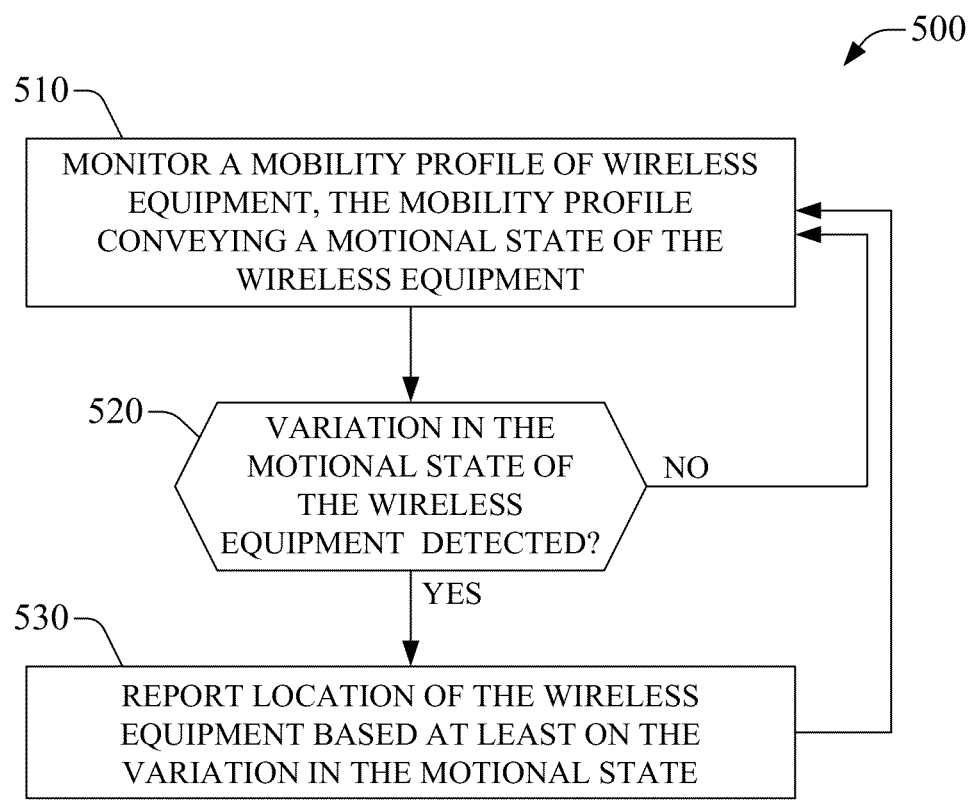
FIGS. 5-6 display example methods for reporting location of wireless equipment (e.g., a mobile device) according to aspects of the subject disclosure.
Figure 6:
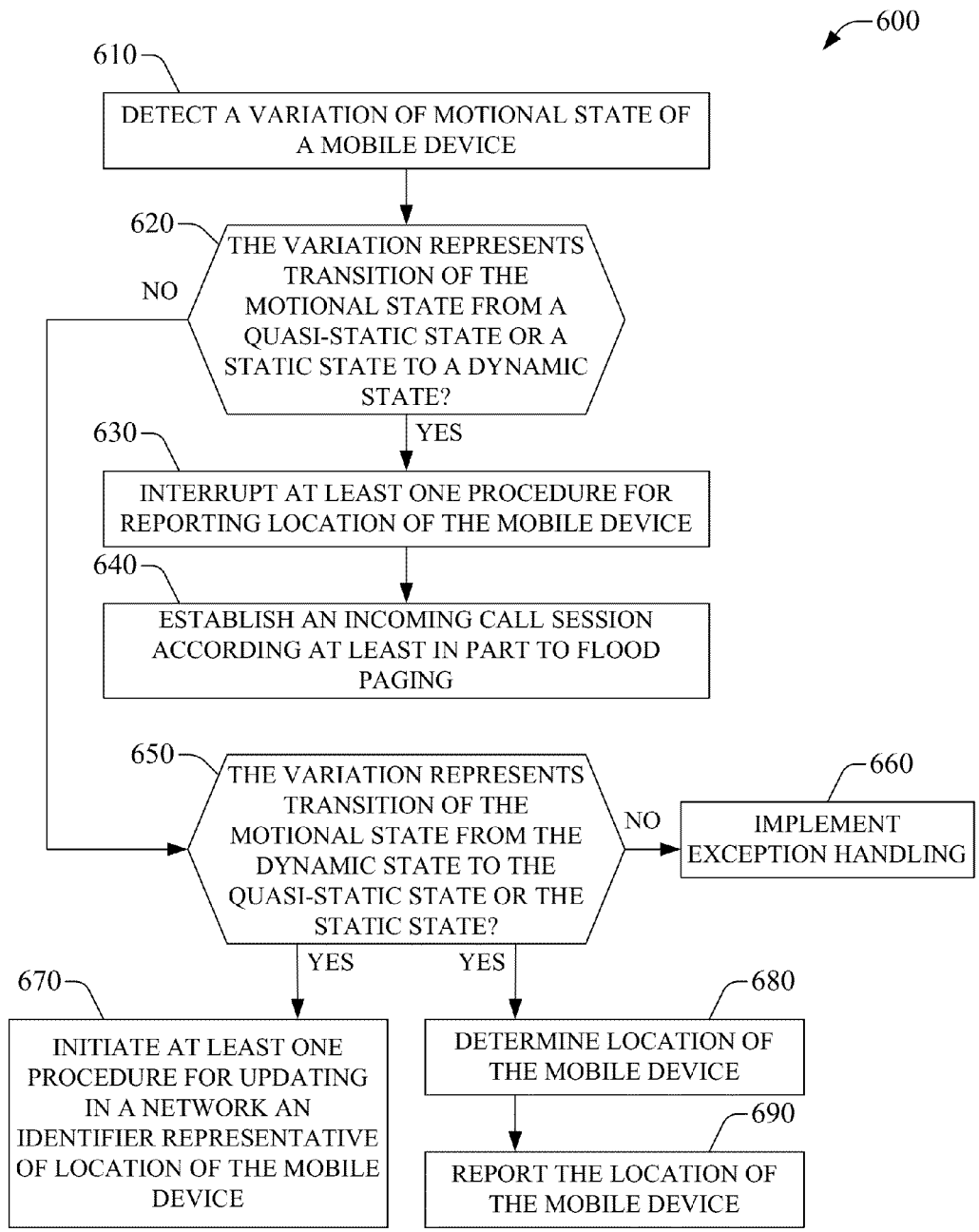
Figure 7:
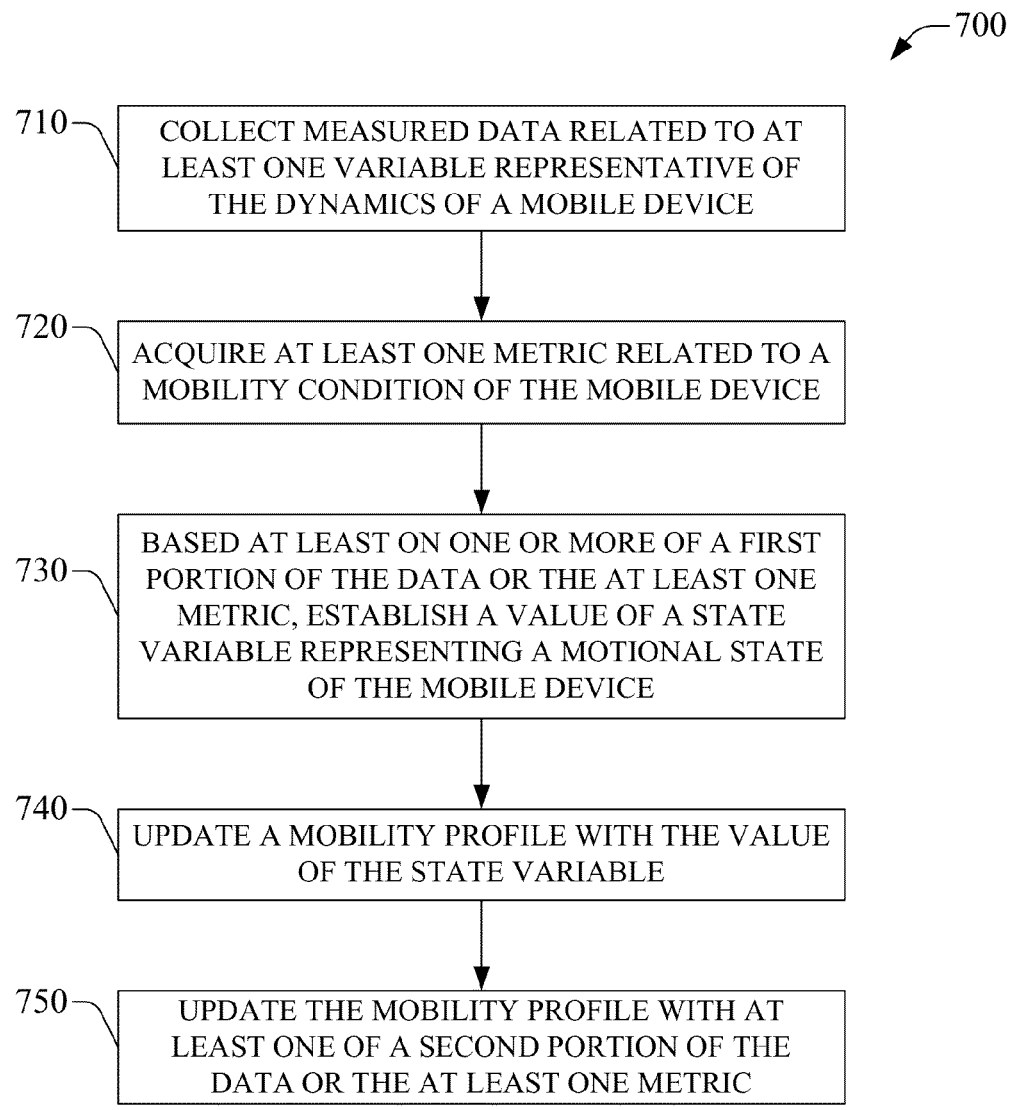
FIG. 7 display an example method for updating a mobility profile of a mobile device according to aspects of the subject disclosure.

In view of the example systems described in preceding passages, example methods that can be implemented in accordance with the disclosed subject matter can be better appreciated with reference to flowchart in FIGS. 5-7. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, one or more example methods disclosed herein can be represented alternatively as a series of interrelated states or events, such as in a state diagram. Moreover, interaction diagram(s) may represent example methods described herein in accordance with the disclosed subject matter when disparate entities enact disparate portions of such example methods. Furthermore, not all illustrated acts may be required to implement a described example method in accordance with the subject specification. Further yet, two or more of the disclosed example methods can be implemented in combination with each other, to accomplish one or more features or advantages described herein.

Methods disclosed throughout the subject specification and annexed drawings are capable of being stored on an article of manufacture to facilitate transporting and transferring such methods to computers, or computing devices, or integrated circuits with processing capability(ies) for execution, and thus implementation, by at least one processor, or for storage in at least one memory (volatile or non-volatile). In an aspect, one or more processors that enact the example methods disclosed herein can be employed to execute computer-executable instructions (also referred to as computer-executable programming code instructions or computer-executable code instructions, or machine-executable instructions) retained in a memory (volatile or non-volatile) or any computer-readable or machine-readable storage medium, in order to implement the example methods disclosed herein. The computer-executable instructions, when executed by the one or more processors, cause the one or more processor to implement or perform the various acts included in the example methods disclosed herein. The machine-executable or computer-executable instructions provide a machine-executable or computer-executable framework to implement (e.g., execute) the example methods described herein.

FIG. 5 is a flowchart of an example method 500 for reporting location of wireless equipment (e.g., a mobile device) according to aspects of the subject disclosure. In an aspect, the wireless equipment (e.g., mobile device 300) or one or more component(s) therein can implement (e.g., execute), at least in part, the subject example method. In another aspect, at least one processor configured to enable or that enable at least part of the functionality to the wireless equipment or the one or more component(s) therein also can implement (e.g., execute), at least in part, the subject example method. In yet another aspect, in scenarios in which the one or more component(s) in the wireless equipment is embodied in one or more sets of computer-executable instructions stored in a memory, a processor that executes the one or more sets of computer-executable instructions, can implement the subject example method.

At act 510, a mobility profile of wireless equipment (e.g., mobile device 300) is monitored, wherein the mobility profile conveys a motional state of the wireless equipment. At act 520, it is determined if a variation in the motional state of the wireless equipment (e.g., mobile device 300) is detected in response to monitoring the mobility profile. Acts 510 and 520 collectively embody the act of detecting variations in the motional state of the wireless equipment (e.g., mobile device 300). Determination of whether a variation in the motional state of the wireless equipment can be performed as described hereinbefore.

In a scenario outcome of act 520 determines that a variation in such state is not detected, flow is directed to act 510 and further monitoring is conducted. In the alternative, in a scenario in which outcome of act 520 establishes that a variation in the motional state of the wireless equipment (e.g., mobile device 300) is detected, location of the wireless equipment (e.g., mobile device 300) is reported based at least on the variation in the motional state at act 530. In response to reporting the location of the wireless equipment (e.g., mobile device 300), flow is directed to act 510 and further monitoring is conducted. In certain embodiments, flow can be redirected to act 510 according to a monitoring protocol (which can be retained in method storage 268) that establishes, in part, termination conditions for monitoring the mobile profile of the wireless equipment (e.g., mobile device 300).

Reporting location of wireless equipment, such as a mobile device, based at least on variation of motional state of the wireless equipment (e.g., mobile device 104 or mobile device 300) can be accomplished through various acts, as illustrated in the flowchart of example method 600 presented in FIG. 6. Wireless equipment (e.g., mobile device), component(s), or processor(s) that effect (e.g., execute) at least act 530 also can effect example method 600. Example method 600 is illustrated with reference to a mobile device; however, the subject example method can be exploited for any or most any wireless equipment. At act 610, a variation of the motional state of the mobile device is detected. Detecting such variation can include decoding a value of a state variable indicative of the motional state.

At act 620, it is determined if the variation represents transition of the mobile device from a quasi-static state (e.g., pedestrian mobility condition) or a static state to a dynamic state (e.g., vehicular mobility condition). In an affirmative scenario, at act 630, at least one procedure for reporting location of the mobile device is interrupted; For example, LAU in response to change of LAC is halted. For another example, measurement of location of the mobile device and conveyance of such location to a network node (e.g., server) can be halted. At act 640, an incoming call session is established according at least in part to flood paging. In the alternative, in a scenario in which a determination is made that the variation is not a transition from the quasi-static state or the static state to the dynamic state, flow is directed to act 650. At such act, it is determined if the variation represents transition of the motional state of the mobile device from the quasi-static state or the static state to the dynamic state. In an affirmative scenario, two branches of acts can be implemented: A first branch includes act 670, in which at least one procedure for updating in a network a network ID representative of location of the mobile device initiated. The at least one procedure, and related signaling, for updating such network ID is specific to the radio technology (e.g., 3GPP UMTS, 3GPP LTE, Wi-Fi . . . ) utilized for telecommunication by the mobile device; as described in preceding passages, for example, in UMTS-based technology, the at least one procedure can be location area update (LAU) or routing area update (RAU). Likewise, the network ID also is specific to the radio technology that the mobile device exploits for telecommunication; the network ID can be LAC, SSID, or other suitable identifier. As an example of act 670, transition of the mobile device from vehicular mobility to pedestrian mobility results in LAU procedure being triggered to update the LAC in which the mobile device is located. A second branch includes act 680 in which location of the mobile device is determined, and act 690 in which the location of the mobile device is reported. Determining the location of the mobile device can include collecting timing messages from a GNSS and processing (e.g., trilaterating) such timing messages to extract the location of the mobile device. In the alternative or in addition, determining the location of the mobile device can include performing time of flight measurements and, based on data gathered through such measurements, estimate the location of the mobile device. Moreover, in embodiments in which a mobility profile of the mobile device includes position of the mobile device, determining the location of the mobile device can include accessing the mobility profile and extracting the position (e.g., location) of the mobile device. Reporting the location of the mobile device can include delivering a notification with payload data indicative of such location; the location of the mobile device can be reported to at least one server in a wireless network platform that serves the mobile device. In certain embodiments, variations of example method 600 can implement one of the first branch or the second branch.

In the alternative, in a scenario in which outcome of act 650 establishes that the variation of the mobility profile does not represent a transition from the dynamic state (e.g., vehicular mobility condition) to the quasi-static state (e.g., pedestrian mobility condition) or the static state, exception handling is implemented at act 660. In embodiments in which the mobility profile includes the state variable but does not include additional variables and related data indicative of mobility features of the mobile device, implementing exception handling includes generating and delivering an error report. In alternative embodiments in which the mobility profile includes the state variable and such variables and related data indicative of mobility features of the mobile device, implementing exception handling can include processing the data indicative of mobility features of the mobile device.

As previously described, a mobility profile can characterize mobility features of a mobile device through various degrees of detail. The mobility profile can include of a state variable indicative of motional state of the mobile device or, in the alternative, the mobility profile can include of such state variable and at least one dynamic variable representative of the dynamics of mobile device. FIG. 7 is a flowchart of an example method 700 for updating a mobility profile of a mobile device according to aspects described herein. Example method 700 is illustrated with reference to a mobile device; however, the subject example method can be exploited for any or most any wireless equipment.

At act 710, measured data related to at least one variable representative of the dynamics of the mobile device is collected. The at least one variable can include position, velocity, acceleration: For example, the data can be related to at least position and acceleration. For another example, the data can be related to velocity and bearing of the mobile device. For yet another example, the data can be related to velocity of the mobile device. Velocity can be linear velocity or angular velocity. Likewise, acceleration can be linear acceleration or angular acceleration. At act 720, at least one metric related to a mobility condition of the mobile device is acquired. Acts 710 and 720 collectively embody the act of acquiring data indicative of the mobility condition of the mobility device (or, in general, wireless equipment).

At act 730, based at least on one or more of a first portion of the data or the at least one metric, establish a value of a state variable representing a motional state of the mobile device. As an example, the value can be "Launch" to indicate the motional state of the mobile device is a dynamic state (e.g., vehicular mobility). As another example, the value can be "Land", which indicates such motional state is a quasi-static state (e.g., pedestrian mobility). At act 740, the mobility profile is updated with the value of the state variable. In an aspect, updating the mobility profile includes creating, modifying, or deleting at least one record in a database or memory element (e.g., mobility profile(s) 410) that retains the mobility profile. At act 750, the mobile profile is updated with at least one of a second portion of the data or the at least one metric.

In connection with the various embodiments of the monitor profile indicated in previous passages, implementation (programming, execution, etc.) of acts 740 and 750 generates a mobility profile that includes the state variable representative of motional state of the mobile device and data related to the dynamics thereof. In the alternative, in embodiments of method 700 in which act 750 is not implemented (programmed, compiled, linked, executed, etc.), the mobility profile includes such state variable but at least a portion of the data related to the dynamics thereof is unavailable in the mobility profile.

Various advantages of the subject disclosure emerge from the example systems and methods described herein: (1) For example, signaling associated with location update activity of a mobile device is reduced with respect to conventional telecommunication technologies. (2) For another example, since different mobile devices generally transition from a dynamic state into a quasi-static state or static state at different locations under different cell sites or sector sites, impact on signaling load related to location reporting described herein is well distributed throughout a location area rather than being primarily localized at the border of the location area.

Computing devices (e.g., mobile devices) that implement various aspects of the subject disclosure typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media As it is employed in the subject disclosure, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory elements described herein can be affixed, removable, or a combination thereof.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through code instructions, or program modules, stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

It should be appreciated that while various aspects, features, or advantages described herein have been illustrated through femtocell access point(s) and associated coverage, such aspects or features also can be exploited in confined-coverage access point(s) that provide wireless coverage through substantially any or any disparate telecommunication technologies, such as for example Wi-Fi (wireless fidelity) or picocell telecommunication. Moreover, aspects, features, or advantages of the subject disclosure can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Furthermore, substantially all aspects of the subject disclosure can include legacy telecommunication technologies.

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
receiving, by a system comprising a processor, a set of data representing a variation of a motional state of a wireless device;
monitoring a subset of the data representing a transition of the motional state of the wireless device from being in a defined static movement condition to being in a defined non-static movement condition;
halting, by the system, an update to location data representative of a location of the wireless device while the wireless device is in the defined non-static movement condition, wherein the defined non-static movement condition corresponds to a state associated with the wireless device moving from a location area comprising the location to a different location area; and
resuming, by the system, the update of the location data in response to the wireless device being determined to have transitioned to being in an undefined state.

2. The method of claim 1, wherein the defined static movement condition is based on a data variable of a set of data variables comprising a time value, a position value, a velocity value, and an acceleration value.

3. The method of claim 1, further comprising:
generating, by the system, profile data representing a mobility profile that comprises a record of a location of the wireless device relative to a location area border and a state variable of a datum, wherein the state variable of the datum is at least one of a time, a position, a velocity, or an acceleration.

4. The method of claim 3, wherein the update of the location data comprises at least one of a creation of a data record, a modification of the data record, or a deletion of the data record in a first memory of a database or a second memory retained in a mobility profile while the mobile device is in the defined non-static movement condition.

5. The method of claim 1, further comprising:
correlating, by the system, the subset of the data to mobility profile data representing a mobility profile, wherein the mobility profile data represents the motional state of the wireless device.

6. The method of claim 1, further comprising:
analyzing, by the system, first data relating to the defined non-static movement condition associated with the wireless device, wherein the defined non-static movement condition relates to the motional state of the wireless device; and
distributing, by the system, to a network device, the location data related to the location of the wireless device based on the variation of the motional state of the wireless device.

7. The method of claim 1, further comprising:
monitoring another set of data related to the transition of the motional state of the wireless device from a defined quasi-static movement condition to the defined non-static movement condition; and
in response to a subset of the other set of data being determined to represent the transition of the motional state from the defined quasi-static movement condition to the defined non-static movement condition, determining, by the system, the location of the wireless device.

8. The method of claim 1, wherein the set of data is related to at least one of a linear velocity, an angular velocity, a linear acceleration, or an angular acceleration of the wireless device.

9. The method of claim 1, wherein the subset of the data further represents a transition of the motional state of the wireless device from a defined quasi-static movement condition to the defined static movement condition.

10. The method of claim 1, further comprising:
aggregating, by the system, a set of location data, comprising the location data, representing the location of the wireless device within different location areas;
analyzing, by the system, another subset of the data representing the location of the wireless device in relation to a location boundary; and
determining, by the system, the proximity of the wireless device to the location boundary using the subset,
wherein the halting comprises halting the update of the location data using a determined proximity of the wireless device to the location boundary.

11. A device, comprising:
a memory to store executable instructions; and
a processor, coupled to the memory, that facilitates execution of the executable instructions to perform operations, comprising:
identifying a transition from a defined non-static state to a defined static state, wherein the defined non-static state represents movement of a wireless device within a set of location areas;
in response to identifying the transition of the wireless device, facilitating reporting of location data representing a location of the wireless device; and
suspending an update of the location data representing at least one of first information for updating a visited location register data store, second information for updating data associated with a voice call delivery, third information for delivery of a current location of the wireless device to a network device, or fourth information for delivery of packet data representing the location of the wireless device to another network device, wherein the other network device provides location-based services to the wireless device while the device is determined to be in the defined non-static state.

12. The device of claim 11, wherein the defined static state is a defined quasi-static state associated with a determination that the wireless device is moving between location area crossing points and threshold likely to remain in a current defined location area for a defined period of time wherein the suspending the update of the location data occurs in connection with the determination that the wireless device is moving.

13. The device of claim 11, wherein the suspending the update of the wireless device comprises reducing a signaling associated with the update.

14. The device of claim 11, wherein the suspending the update associated with the wireless device comprises reducing an impact on a signaling load related to the reporting of the location data.

15. The device of claim 11, wherein the operations further comprise: distributing a signaling load associated with reporting the location data to an entire location area.

16. The device of claim 11, wherein the identifying the transition from the defined non-static state to the defined static state with reference to transitioning between border regions of location areas is based on movement data representing a linear velocity, an angular velocity, a linear acceleration, or an angular acceleration of the wireless device, and wherein the suspending comprises suspending the update of the location data based on the transition being identified.

17. The device of claim 11, wherein the suspending the update comprises suspending a creation of a data record, a modification of the data record, or a deletion of the data record associated with the wireless device.

18. The device of claim 11, monitoring another set of data related to the location of the device, at a border region between two location area networks, from a set of sensors, wherein the other set of data comprises a value of a non-static variable that indicates a defined non-static state or the defined static state based on a velocity of the wireless device, and wherein the suspending comprises suspending the update of the location data in connection with the monitoring.

19. A non-transitory computer-readable storage device storing computer-executable instructions that, in response to execution, cause a system comprising a processor to perform operations, comprising:
   receiving data representing a variation of a motional state of a wireless device;
   monitoring a subset of the data representing a transition of the motional state of the wireless device from a defined static movement condition to a defined non-static movement condition;
   stopping an update of the location of the wireless device in response to the wireless device being determined to have transitioned to the defined non-static state, wherein the defined non-static state is a state associated with the wireless device moving to different location areas; and
   resuming the update of the location in response to the wireless device being determined to have transitioned to an undefined non-static state.

20. The non-transitory computer-readable storage device of claim 19, wherein the operations further comprise:
   analyzing data relating to a location update procedure to facilitate the update of the location of the wireless device in a defined coverage area associated with a set of network devices of a wireless network.

* * * * *